(12) United States Patent
Gomez et al.

(10) Patent No.: US 9,140,333 B2
(45) Date of Patent: Sep. 22, 2015

(54) SAW GEAR BOX

(71) Applicant: Merit Engineering & Equipment Company, Santa Ana, CA (US)

(72) Inventors: Pablo Gomez, Prescott, AZ (US); Juan Vielma, Prescott, AZ (US); Greg Ferguson, Orange, CA (US)

(73) Assignee: MERIT ENGINEERING & EQUIPMENT COMPANY, Santa Ana, CA (US)

( * ) Notice: Subject to any disclaimer, the term of this patent is extended or adjusted under 35 U.S.C. 154(b) by 228 days.

(21) Appl. No.: 13/748,528

(22) Filed: Jan. 23, 2013

(65) Prior Publication Data
US 2013/0186222 A1 Jul. 25, 2013

Related U.S. Application Data

(60) Provisional application No. 61/589,849, filed on Jan. 23, 2012.

(51) Int. Cl.
| | |
|---|---|
| *F16H 3/22* | (2006.01) |
| *F16H 3/32* | (2006.01) |
| *B28D 1/06* | (2006.01) |

(52) U.S. Cl.
CPC *F16H 3/32* (2013.01); *B28D 1/068* (2013.01); *F16H 2200/0043* (2013.01); *Y10T 74/19251* (2015.01); *Y10T 74/19307* (2015.01)

(58) Field of Classification Search
USPC .......................................................... 74/352
See application file for complete search history.

(56) References Cited

U.S. PATENT DOCUMENTS

| | | | | |
|---|---|---|---|---|
| 2,219,958 | A * | 10/1940 | Krause | 74/350 |
| 3,347,108 | A * | 10/1967 | Hinke | 74/342 |
| 5,394,765 | A | 3/1995 | Ono et al. | |
| 5,690,391 | A | 11/1997 | Kingsley et al. | |
| 5,743,247 | A | 4/1998 | Kingsley et al. | |
| 5,809,985 | A | 9/1998 | Kingsley et al. | |
| 7,270,023 | B2 * | 9/2007 | Kramer | 74/15.4 |
| 7,645,183 | B2 | 1/2010 | Marques et al. | |
| 7,793,560 | B2 * | 9/2010 | Bodine et al. | 74/337 |
| 2007/0163565 | A1 | 7/2007 | Meister | |
| 2009/0056486 | A1 * | 3/2009 | Mothaffar | 74/416 |

FOREIGN PATENT DOCUMENTS

JP 06033417 A 2/1994

* cited by examiner

*Primary Examiner* — Ha D Ho
(74) *Attorney, Agent, or Firm* — Cislo & Thomas, LLP; Kelly W. Cunningham, Esq.

(57) ABSTRACT

A motor-driven concrete cutting saw and method in which the motor has an idler gear, a top slider gear slidably engageable and disengageable with the idler gear; and a bottom slider gear slidably engageable and disengageable with the idler gear. Both the top and bottom slider gears have two toothed disks, and the idler gear has two toothed disks, a main gap, and a third toothed disk. The toothed disks are sized to produce, when engaged with one another, multiple speeds including a neutral setting that would allow the motor to disengage from the saw blade while running.

6 Claims, 8 Drawing Sheets

SAW GEAR BOX

CROSS-REFERENCES TO RELATED APPLICATIONS

This patent application claims the benefit of U.S. Provisional Application No. 61/589,849, filed Jan. 23, 2012, which is incorporated herein by this reference thereto.

BACKGROUND OF THE INVENTION

1. Field of the Invention

This invention relates to concrete cutting saws and more particularly motor-driven concrete cutting saws or saws for other hard substrates having the capability of operating at two or more speeds.

2. Description of the Related Art

Current concrete saws are limited in the number of transmission gears they offer. In addition, these saws are missing a neutral gear position. With a limited number of transmission gears, cutting through concrete becomes a more difficult and laborious task. The depth of the cut into the concrete will determine the proper torque, speed, and size of the saw required for an efficient cut. As a user cuts deeper into a concrete slab, we will want the ability to use the proper size saw spinning at the proper torque and speed. Without this option, it will take much longer to cut through the concrete slab.

At the same time, the user needs to be able to move the saw into various positions and locations. As concrete saws tend to be bulky and heavy, moving the saw from one location to another location is burdensome. Having the saw running makes it easier to transport, however a running blade is extremely dangerous, and such actions may be prohibited.

Therefore, there is a need for a concrete saw with more transmission speed options to improve the efficiency of cutting through concrete slabs and with the ability to have the saw transported easily without having the saw running.

SUMMARY OF THE INVENTION

One embodiment of the present invention comprises a motor-driven concrete cutting saw or saws for other hard substrates in which the motor has the capability of operating at two or more speeds. This particular embodiment comprises a multi-speed gear box that may additionally include a neutral setting that would allow the motor to disengage from the saw blade while running.

One embodiment of the present invention comprises a motor-driven concrete cutting saw capable of affording the option of two or more speeds of operation, and preferably four speeds. Some embodiments comprise a multi-speed gear box that includes a neutral setting in which the motor may disengage from the blade as a safety feature. As a result, the saw may be safely moved around in neutral without the saw blade rotating and also without having to shut off the motor each time the saw needs to be moved.

The innovative mechanism in one embodiment comprises one or more gears that may be moved into and out of engagement with a splined shaft. Other such embodiments may employ one or more shifting forks to facilitate smooth transitions in and out of engagement with various drive speed gears and the neutral setting. The gears, shaft and forks may be configured such that the movement from engagement to disengagement may be in the direction radially away from the shaft. In other embodiments, these elements may be configured such that the movement from engagement to disengagement may be in a direction parallel to the shaft.

DESCRIPTION OF THE PREFERRED EMBODIMENTS

The detailed description set forth below in connection with the appended drawings is intended as a description of presently-preferred embodiments of the invention and is not intended to represent the only forms in which the present invention may be constructed and/or utilized. The description sets forth the functions and the sequence of steps for constructing and operating the invention in connection with the illustrated embodiments. However, it is to be understood that the same or equivalent functions and sequences may be accomplished by different embodiments that are also intended to be encompassed within the spirit and scope of the invention.

In general, the concrete saw is similar to other concrete saws in the prior art with the exception of a new multi-speed transmission gear system that allows for four speeds and a neutral position.

Figure 1A:
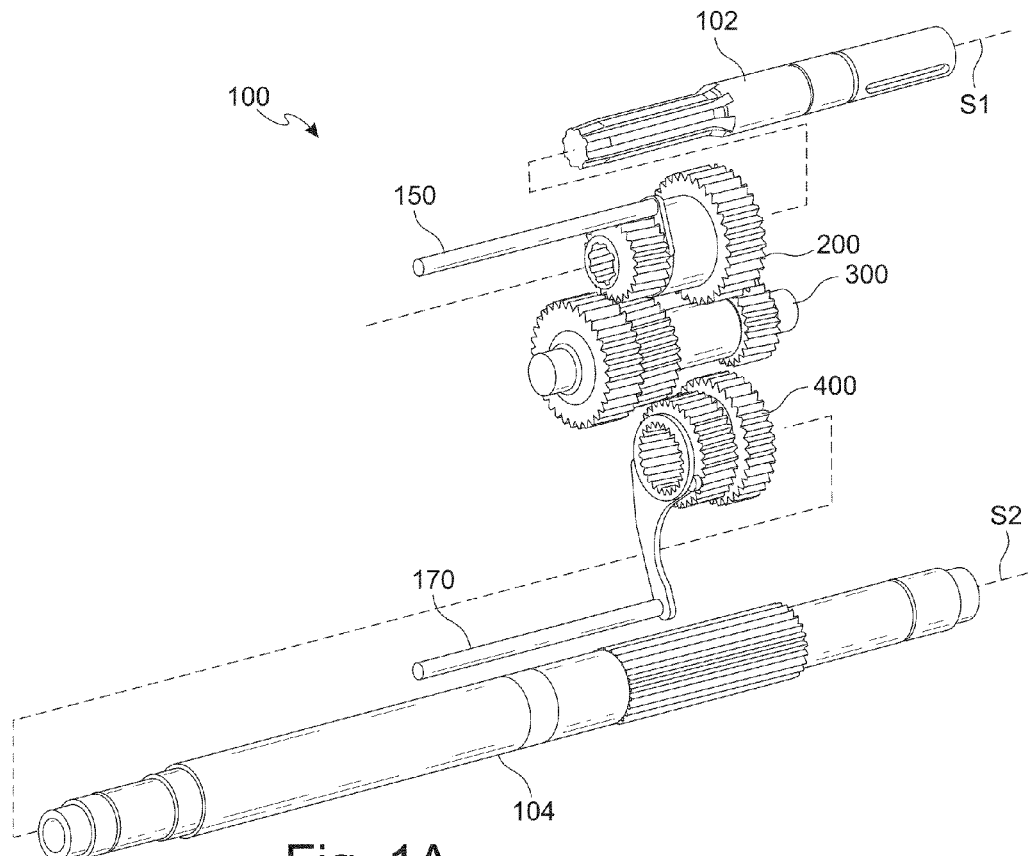
FIG. 1A shows a perspective view of an embodiment of the transmission gears with their respective shafts removed from the gears for clarity, but shown.
Figure 1B:
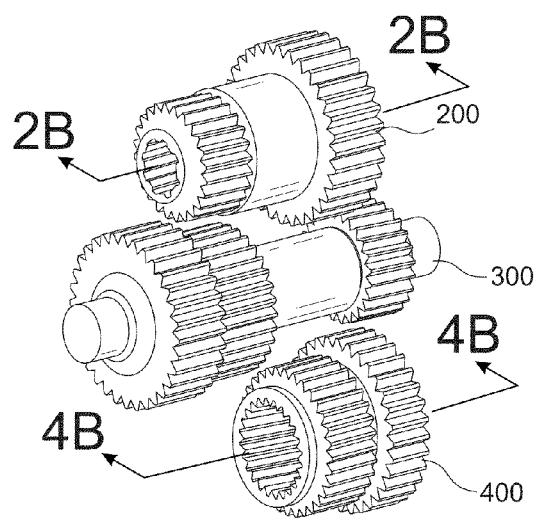
FIGS. 1B-1G show side views of the transmission gears in different gear positions.
Figure 5A:
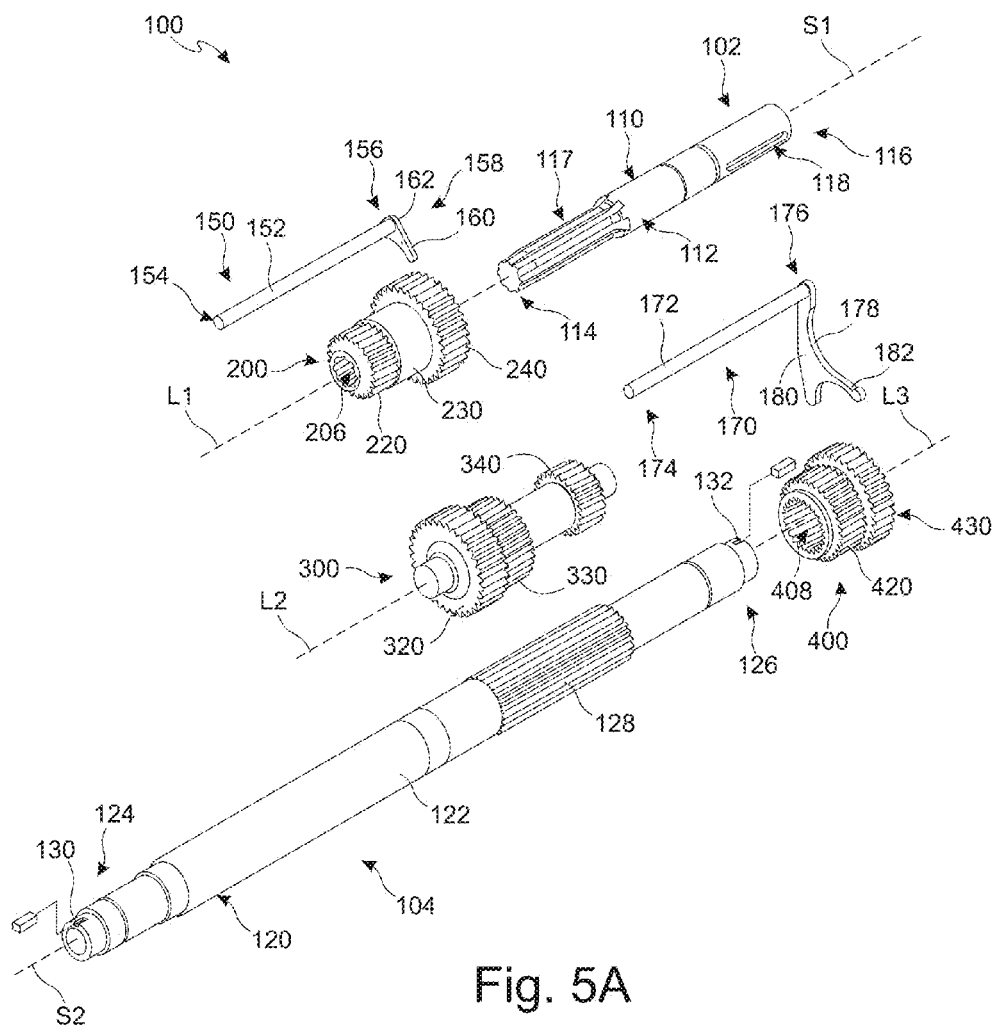
FIG. 5A shows an exploded view of an embodiment of the transmission gear.

With reference to FIGS. 1A and 5A, the multi-speed transmission gear system 100, comprises an input shaft 102, and input slider gear or top slider gear 200, an idler gear 300, an output shaft 104, and a bottom slider gear or output slider gear 400. Positional terms, such as "top" and "bottom" are used for convenient nomenclature only, based on the positioning in the preferred embodiment of the present invention. These terms are not intended to be limiting with regards to position relative to each other. It is to be understood that the positions can be switched without departing from the scope of the present invention.

Figures 2A, 2C:
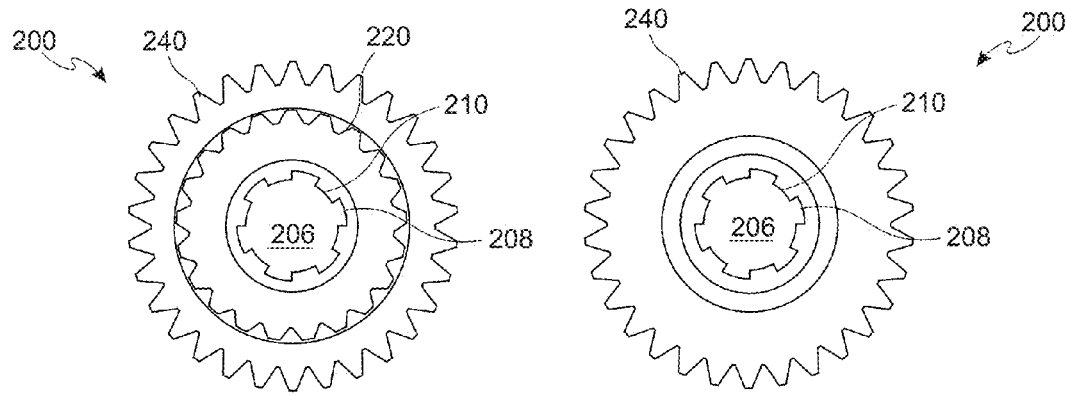
FIGS. 2A-2C show front, side, and rear views, respectively, of an embodiment of the top slider gear.
Figure 2B:
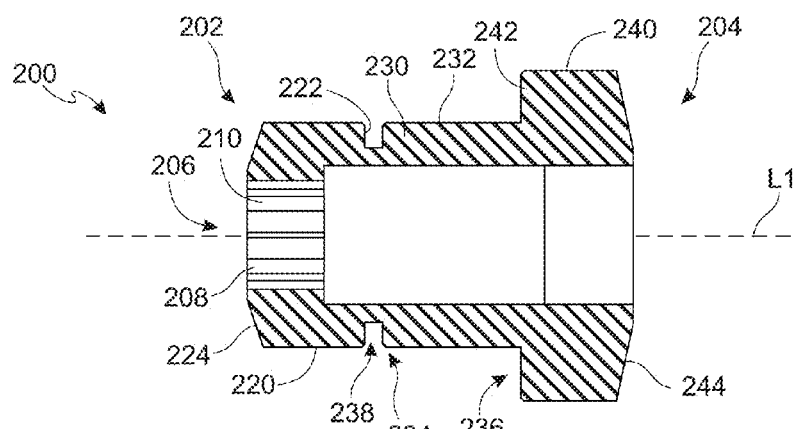

The characteristics and interactions between the top slider gear (or input slider gear) 200, the idler gear 300, and the bottom slider gear (or output slider gear) 400 permit the possibility of at least four speeds and a neutral. With reference to FIGS. 2A-2C, the top slider gear 200 is operatively connectable to the input shaft 102. In the preferred embodiment, the top slider gear 200 may be generally bolt shaped having an elongated body defining a first longitudinal axis L1. The top slider gear 200 has a first end 202, a second end 204 opposite the first end 202 with the first longitudinal axis L1 running through the first and second ends 202, 204 of the top slider gear 200, and a first central channel 206 defined by a first inner surface 208 extending from the first end 202 to the second end 204 and concentric about the first longitudinal axis L1. The inner surface 208 may have a first splined surface 210 configured with the proper dimensions to mate or mesh with a first splined portion 117 of the input shaft 102.

In the preferred embodiment, the top slider gear 200 may have a first toothed disk 220 at the first end 202 of the top slider gear 200, the first toothed disk 220 having a first size; a body portion or top slider gear shaft 230 defined by a smooth outer surface 232 having a first end 234 and a second end 236 opposite the first end 234 of the body portion 230, wherein the first end 234 of the body portion 230 is adjacent to the first toothed disk 220; and a second toothed disk 240 at the second end 204 of the top slider gear 200 adjacent to the second end 236 of the body portion 240. The second toothed disk 240 has a second size, wherein the second size is larger than the first size. The first and second toothed disks 220, 240 are concentrically arranged about the first longitudinal axis L1 but axially separated apart by the body portion 230. The size of a toothed disk refers to the number of teeth and possibly the outer or major diameter of the toothed disk (i.e., the diameter of the toothed disk measured from the tip of one tooth to the tip of the diametrically opposite tooth). Therefore, when one toothed disk is referred to as being larger than another toothed disk it is meant that the larger toothed disk has more teeth and possibly a larger diameter than the other toothed disk. Similarly, when a toothed disk is referred to as being smaller than another toothed disk, it is meant that the smaller toothed disk has fewer teeth and possibly a smaller diameter. However, the pitch of the toothed disks that mesh with each other is the same so they can mesh with each other in use.

In some embodiments, the top slider gear 200 may have a first circumferential groove 238 along the smooth outer surface 232 of the body portion 230 adjacent to the first toothed disk 220. Each toothed disk 220, 240 has a medial face 222, 242 facing each other and an outer face 224, 244 facing away from each other. In some embodiments, the outer faces 224, 244 of each toothed disk 220, 240 (or any other disk described herein) may be beveled to make it easier to engage with other toothed disks as described below.

The top slider gear 200 is operatively coupled to the input shaft 102. The input shaft 102 in turn drives the top slider gear 200. As shown in FIG. 5A, in the preferred embodiment, the input shaft 102 is defined by an elongated body 110 having a first outer surface 112, a first end 114, and a second end 116 opposite the first end, the input shaft 102 defining a first shaft axis S1. The outer surface 112 may have a splined portion 117 extending from the first end 114 of the elongated body 110 of the input shaft 102 towards the second end 116 of the elongated body 110 of the input shaft 102. In the preferred embodiment, the input shaft 102 may also have a first slot 118 at the second end of the elongated body.

The diameter of the input shaft 102 is substantially similar to the diameter of the first inner surface 208 in the top slider gear 200. This permits the top slider gear 200 to mount on to the input shaft 102. Once mounted properly, the first splined surface 210 in the top slider gear 200 meshes with the first splined portion 116 on the input shaft 102. This meshing permits the input shaft 102 to rotate the top slider gear 200 about its first longitudinal axis L1 while also permitting the top slider gear 200 to slide along the input shaft 102.

In some embodiments, rather than splined surfaces and splined portions, other means for having the input shaft catch the top slider gear can be used. For example, any protrusion, hook, catch, protuberance, and the like, projecting radially outwardly from the input shaft 102 and radially inwardly from the inner surface (referred to as the first inner surface 208) defining the central channel 206 of the top slider gear 200, such that rotational movement of the input shaft 102 about shaft axis S1 causes the protrusion, hook, catch, protuberance, and the like to catch a reciprocal protrusion, hook, catch, protuberance, and the like on the first inner surface 208 to cause the input shaft 102 and the top slider gear 200 to rotate together. In some embodiments, input shafts having non-circular cross-sections and central channels 206 having similarly shaped cross-sectional areas can also be used to have the input shaft drive the top slider gear 200, while permitting the top slider gear to slide along the input shaft longitudinally.

Figure 3:
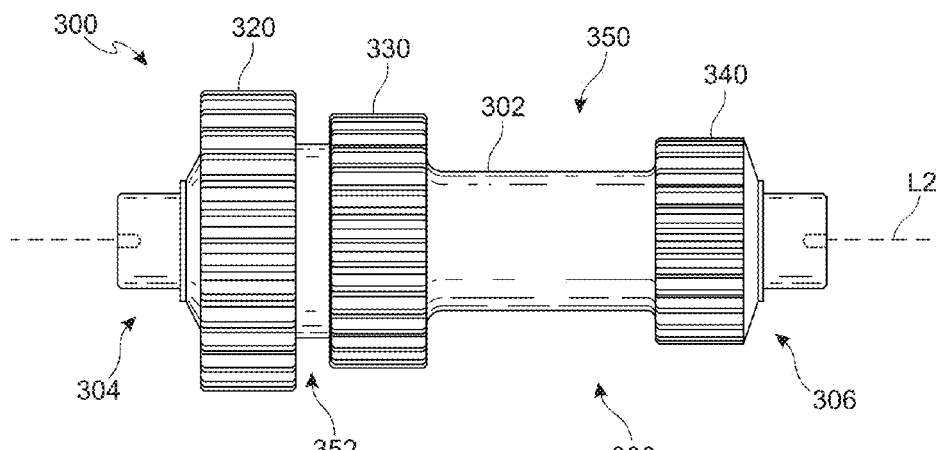
FIG. 3 shows a side view of an embodiment of the idler gear.

With reference to FIG. 3, the idler gear 300 has an idler gear shaft 302 defining a second longitudinal axis 12, the idler gear shaft 302 having a first end 304 and a second end 306 opposite the first end 304, the second longitudinal axis L2 running through the first and second ends 304, 306 of the idler gear shaft 302. A third toothed disk 320 is positioned at the first end 304 of the idler gear shaft 302, the third toothed disk 320 having a third size. A fourth toothed disk 330 is positioned on the idler gear shaft 302 adjacent to the third toothed disk 320, the fourth toothed disk 330 having a fourth size. A fifth toothed disk 340 is positioned at the second end 306 of the idler gear shaft 302, the fifth toothed disk 340 having a fifth size. In the preferred embodiment, the third size is greater than the fourth size, and the fourth size is greater than the fifth size. As the diameters of the toothed disks 320, 330, 340 are larger than the diameter of the idler gear shaft 302, and the fourth toothed disk 330 and the fifth toothed disk 340 are separated by a specified distance, a main gap 350 is created in between the fourth toothed disk 330 and the fifth toothed disk 340. In addition, a second gap 352 may exist between the third toothed disk 320 and the fourth toothed disk 330.

The idler gear 300 and the top slider gear 400 are configured and dimensioned so as to allow specific toothed disks on the idler gear 300 to engage and disengage with specific toothed disks of top slider gear 200 depending on the positioning of the top slider gear 200 as discussed further below. In other words, the idler gear 300 and the top slider gear 200 are arranged so that their respective longitudinal axes are parallel, but not collinear with each other, but close enough together so some of the toothed disks are engageable and disengageable with each other depending on the axial positioning of the top slider gear 200 as described below.

Figure 4A:
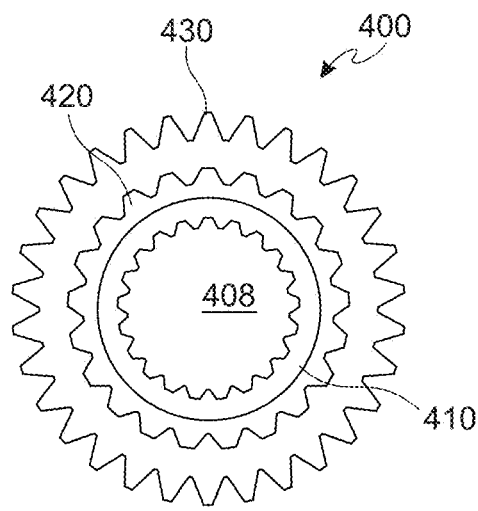
FIGS. 4A-B show a front and side view, respectively, of an embodiment of the bottom slider gear.
Figure 4B:
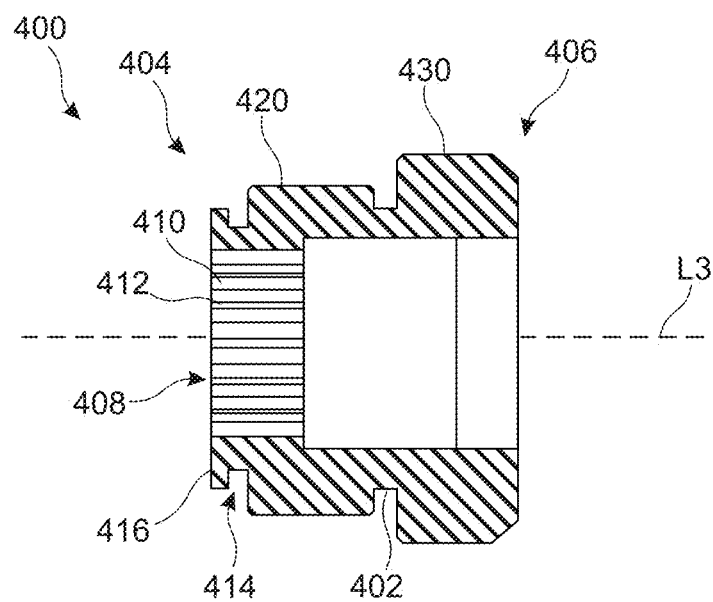

With reference to FIGS. 4A and 413, the bottom slider 400 gear has a bottom slider gear shaft 402 defining a third longitudinal axis L3, the bottom slider gear shaft 402 having a first end 404 and a second end 406 opposite the first end 404, the third longitudinal axis L3 running through the first and second ends 404, 406 of the bottom slider gear shaft 400. A second central channel 408 is defined by an inner surface of the bottom slider gear shaft 402 (referred to as the second inner surface 410) and extends from the first end 404 of the bottom slider gear shaft 402 to the second end 406 of the bottom slider gear shaft 402. The second central channel 408 is concentric about the third longitudinal axis L3. In some embodiments, the second inner surface 410 may have a second splined surface 412.

The bottom slider gear 400 further comprises a sixth toothed disk 420 at the first end 404 of the bottom slider gear shaft 400, the sixth toothed disk 420 having a sixth size; and a seventh toothed disk 430 at the second end 406 of the bottom slider gear shaft 400, the seventh toothed disk 430 having a seventh size. In the preferred embodiment, the sixth size is smaller than the seventh size. In some embodiments, the bottom slider gear shaft 402 may have a second circumferential groove 414 at the first end 404 of the bottom slider gear shaft 402 defined by a flanged lip 416 at the first end 404 and the sixth toothed disk 420.

The bottom slider gear 400 is operatively connected to an output shaft 104 so as to be the driven gear. As shown in FIG. 5A, the output shaft 104 is defined by a second elongated body 120 having a second outer surface 122, a first end 124, and a second end 126 opposite the first end, the output shaft 104 defining a second shaft axis S2. In the preferred embodiment, the output shaft 104 may have a second splined portion 128 in between the first end 124 of the second elongated body 120 and the second end 126 of the second elongated body 120. The second splined portion 128 on the output shaft 104 is configured with the proper dimensions to mate or mesh with the second splined surface 412 of the bottom slider gear 400. In the preferred embodiment, the output shaft 104 may have a second slot 130 at the first end 124 of the second elongated body 120, and a third slot 132 at the second end 126 of the second elongated body 120.

The idler gear 300 and the bottom slider gear 400 are configured with the proper dimensions so as to allow specific toothed disks on the bottom idler 400 gear to engage and disengage with specific toothed disks of the idler gear 300 as discussed further below.

The top slider gear 200 is able to engage and disengage from the idler gear 300 by sliding along the input shaft 102. Similarly, the bottom slider gear 400 is able to engage and disengage from the idler gear 200 by sliding along the output shaft 104. Sliding of the top slider gear 200 and the bottom slider gear 400 may be accomplished by shifter forks.

As shown in FIGS. 1A and 5A, a top shifter fork 150 may be operatively connected to the top slider gear 200 at the first circumferential groove 238. In the preferred embodiment, the top shifter fork 150 is defined by a first rod 152 having a first end 154 and a second end 156, and a first forked head 158. In the preferred embodiment, the first forked head 158 may be defined by two arms 160 (only 1 visible) converging at an elbow 162 at approximately right angles. The elbow 162 may be attached to the second end 156 of the first rod 152. The first forked head 158 is configured with the proper dimensions to fit within the first circumferential groove 238 of the top slider gear 200.

A bottom shifter fork 170 may be operatively connected to the bottom slider gear 400 at the second circumferential groove 414. The bottom shifter fork 170 may be defined by a second rod 172 having a first end 174 and a second end 176; and a second forked head 178. In the preferred embodiment, the second forked head 178 may have a plate 180 attached to an arcuate arm 182. The plate 180 may also be attached to the second end 176 of the second rod 172. The arcuate arm 182 is configured with the proper dimensions to fit within the second circumferential groove 414.

The top slider gear 200, idler gear 300, and bottom slider gear 400 are uniquely configured with the proper dimensions to form a small, compact unit that engages and disengages with each other in various positions (i.e. three distinct positions each) to provide a multi-speed transmission gear having a neutral position. In particular, they are arranged with their longitudinal axis L1, L2, and L3 parallel to each other. This space saving configuration allows the concrete saw 100 to be a reasonable size while still having more transmission speeds than current concrete saws. In addition, with the addition of multiple toothed disks on the top slider gear 200, the idler gear 300, and the bottom slider gear 400, the number of different torque/speed combinations is increased over current concrete saws.

By way of example only, a top slider gear 200 may have a first toothed disk 220 having 24 teeth with a major diameter of 2.550 inches (major diameter meeting from the tip of one tooth to the tip of the diametrically opposite tooth), and a second toothed disk 240 having 36 teeth with a major diameter of 3.750 inches; an idler gear 300 may have a third toothed disk 320 having 36 teeth with a major diameter of 3.750 inches, a fourth toothed disk 330 having 30 teeth with the major diameter of 3.150 inches, and a fifth toothed disk 340 having 24 teeth with the major diameter of 2.550 inches; and a bottom slider gear 400 may have a sixth toothed disk 420 having 30 teeth with the major diameter of 3.150 inches, and a seventh toothed disk 430 having 36 teeth the major diameter of 3.750 inches. The pitch for each of these toothed disks is the same at 10.

Figure 1C:
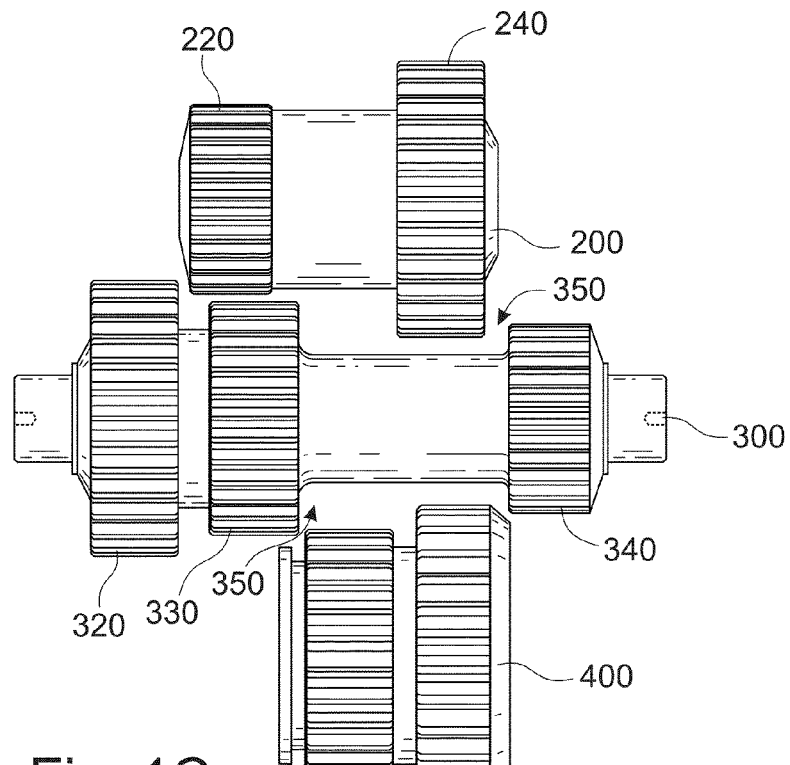

With reference to FIGS. 1B-1G, in the neutral gear position, the second toothed disk 240 on the top slider gear 200 and the sixth and seventh toothed disks 420, 430 on the bottom slider gear 400 reside in the main gap 350 of the idler gear 300. Due to the precise dimensioning of the gears, the first toothed disk 220 on the top slider gear 200 can reside in the main gap 350 or reside above the fourth toothed disk 330 but in a disengaged configuration, as shown in FIG. 1C.

The following references to first, second, third, and fourth gear positions are not meant to be limiting to indicate any progression between the torque and speed imparted onto the gears by these positions. Rather, reference to first, second, third, and fourth gear positions merely indicate that each gear position has a different torque and/or speed relative to another gear position. For example, the first gear position may not necessarily be the highest torque and lowest speed position. It is to be understood that a person of ordinary skill in the art would be able to figure out the relative torque and/or speed of each gear position based on which tooth disks are engaged and the toothed disk sizes.

Figure 1D:
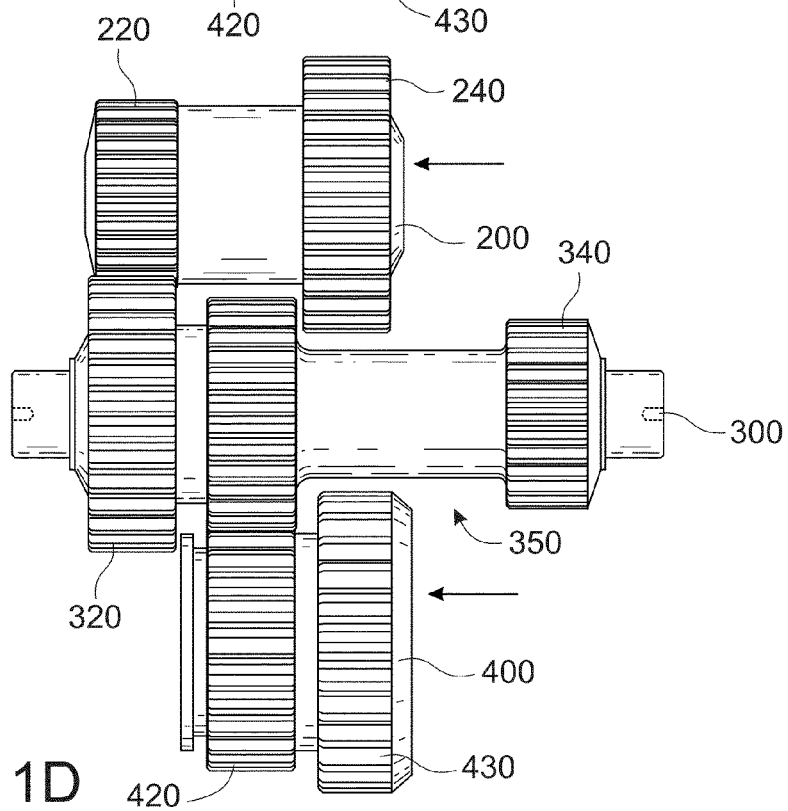

That being said, as shown in FIG. 1D, the transmission gear can be shifted from neutral into a first gear position by sliding the top slider gear 200 so that the first toothed disk 220 resides above and engages the third toothed disk 320 on the idler gear 300 while the second toothed disk 240 on the top slider gear 200 resides in the main gap 350, and sliding the bottom slider gear 400 so that the sixth toothed disk 420 on the bottom slider gear 400 resides below and engages with the fourth toothed disk 330 of the idler gear 300 while the seventh toothed disk 430 of the bottom slider gear 400 resides within the main gap 350.

Figure 1E:
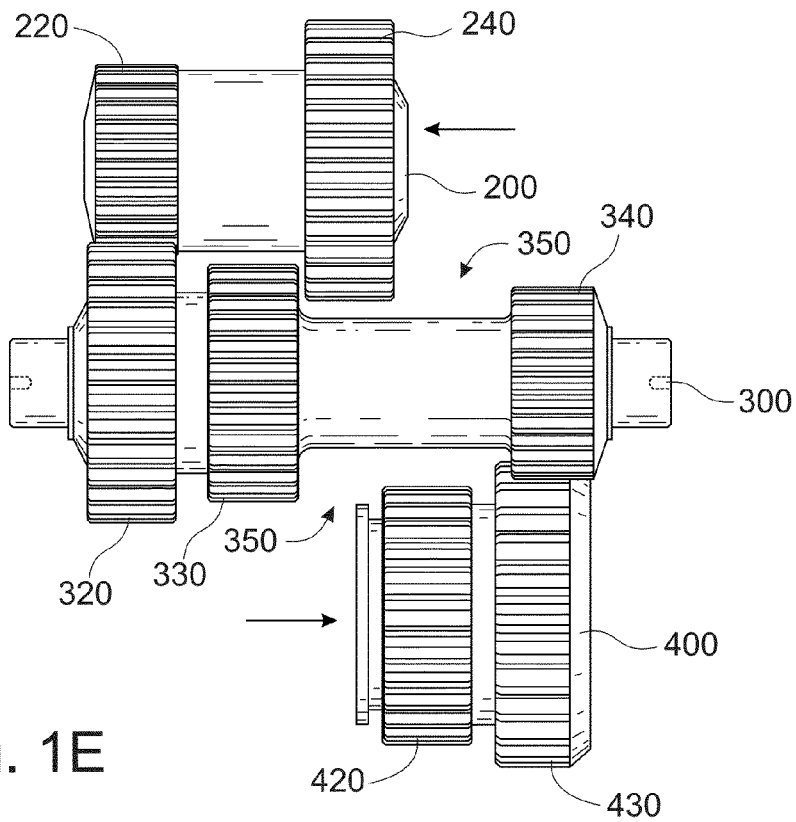

As shown in FIG. 1E, the transmission gear can be shifted into a second gear position from the neutral position by sliding the top slider gear 200 so that the first toothed disk 220 on the top slider gear 200 resides above and engages the third toothed disk 320 on the idler gear 300 while the second toothed disk 240 on the top slider gear 200 resides in the main gap 350, and sliding the bottom slider gear 400 so that the seventh toothed disk 430 on the bottom slider gear 400 resides below and engages with the fifth toothed disk 340 on the idler gear 300 while the sixth toothed disk 420 resides within the main gap 350.

Figure 1F:
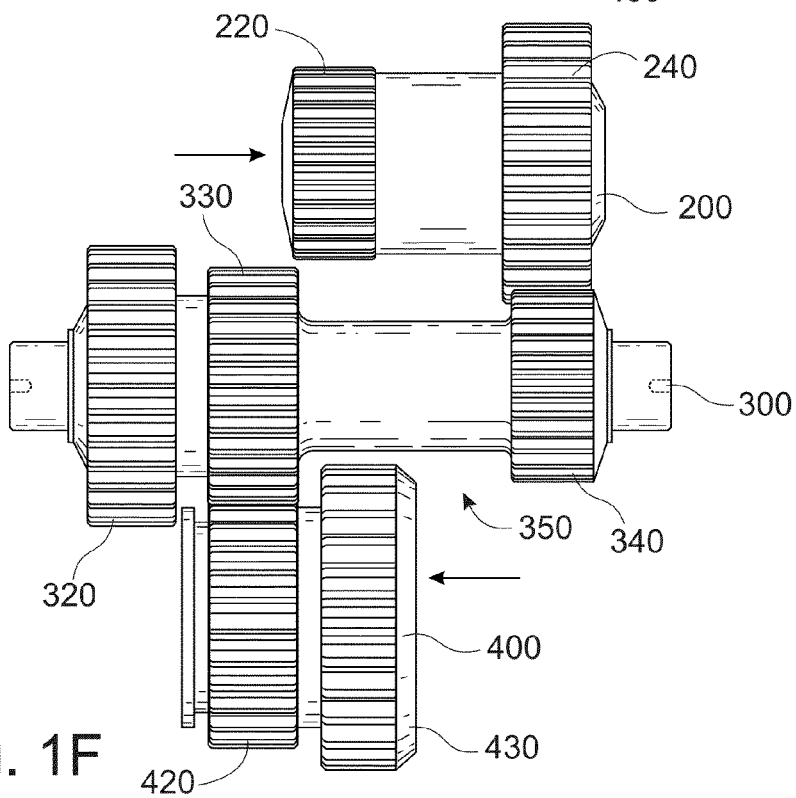

As shown in FIG. 1F, the transmission gear can be shifted into a third gear position from the neutral position by sliding the top slider gear 200 so that the second toothed disk 240 on the top slider gear 200 resides above and engages with the fifth toothed disk 340 on the idler gear 300, while the first toothed disk 200 remains disengaged from the idler gear 300, and sliding the bottom slider gear 400 so that the sixth toothed disk 420 on the bottom slider gear 400 resides below and engages with the fourth toothed disk 330 on the idler gear, while the seventh toothed disk 430 resides in the main gap 350.

Figure 1G:
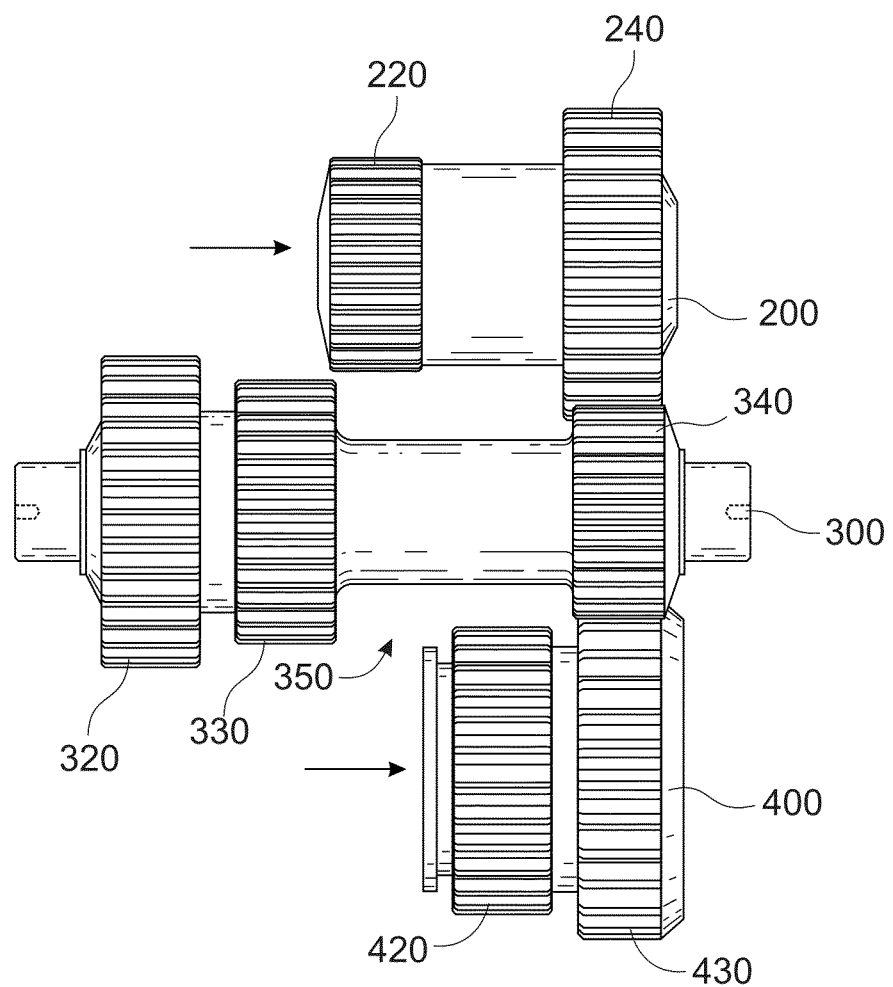

As shown in FIG. 1G, the transmission gear can be shifted into a fourth gear position from the neutral position by sliding the top slider gear 200 so that the second toothed disk 240 on the top slider gear 200 resides above and engages with the fifth toothed disk 340 on the idler gear 300, while the first toothed disk 220 remains disengaged from the idler gear 300, and sliding the bottom slider gear 400 so that the seventh toothed disk 430 on the bottom slider gear 400 resides below and engages with the fifth toothed disk 340 on the idler gear 300, while the sixth toothed disk 420 resides within the main gap 350.

Therefore, the top slider gear 200 has three positions, one in which neither of its toothed disks are engaged with the idler gear 300, one in which the first toothed disk 220 is engaged with the idler gear 300 but not the second toothed disk 340, and one in which the second toothed disk 240 is engaged with the idler gear 300 but not the first. Similarly, the bottom slider gear 400 has three positions, one in which neither of its toothed disks 420, 430 are engaged with the idler gear 300, one in which the sixth toothed disk 420 is engaged with the idler gear 300 but not the seventh toothed disk 430, and one in which the seventh toothed disk 430 is engaged with the idler gear 300 but not the sixth toothed disk 420. Although the shifting of gears were described from neutral, shifting from one gear position to another gear position can take place from any starting gear position, not just from neutral.

The top slider gear 200 is moved along the input shaft 102 via the top shifter fork 150 and the bottom slider gear 4001 is moved along the output shaft 104 via the bottom shifter fork 170 to achieve the configurations described above. In some embodiments, each shifter fork may be moved independent of each other. In other embodiments, a main stick may control both shifter forks 102, 104 simultaneously or in series, such that a first main stick position of the main stick automatically puts the top slider gear 200 and the bottom slider gear 400 into the proper position for the first gear position, a second main stick position automatically puts the top and bottom slider gears in the proper position for the second gear position, and so on.

In an alternative embodiment, the four-speed transmission with a neutral can be designed using a top slider gear having two toothed disks, the idler gear having two toothed disks, and the bottom slider gear having two toothed disks, wherein the toothed disks are of different sizes so as to create four different torque/speed outputs, and a neutral, utilizing the concepts discussed above.

Figure 5B:
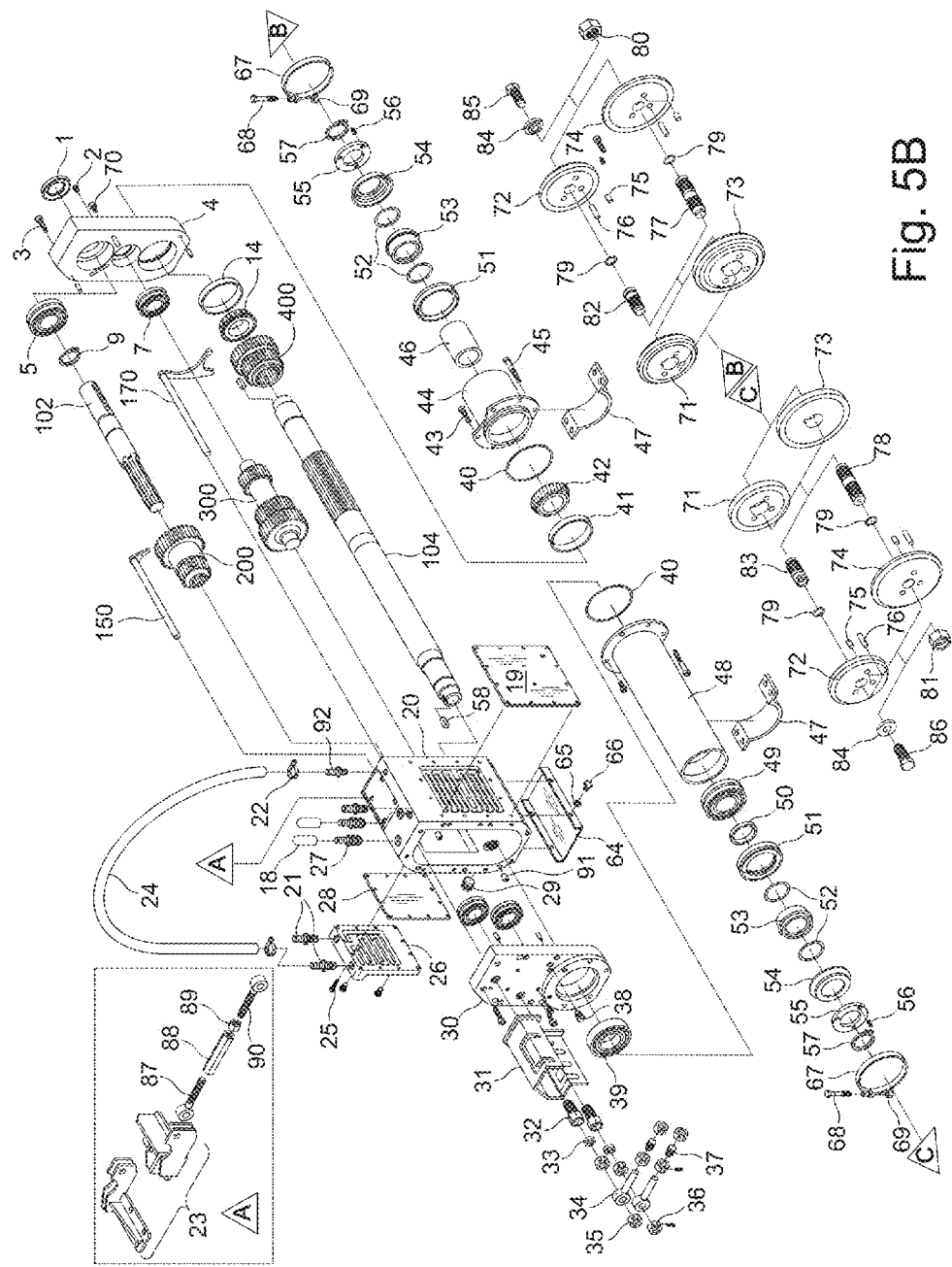
FIG. 5B shows an exploded view of an embodiment of the components of a gear box containing the transmission system for a concrete cutting saw.

Table 1 shows a listing of parts that can be used to manufacture an embodiment of the transmission gear of the present invention according to the exploded view shown in FIG. 5B.

TABLE 1

| No. | Description | QTY. |
|---|---|---|
| 1 | Seal 40 × 60 × 10 | 1 |
| 2 | HEX PLUG 2HP50NS | 9 |
| 3 | SHCS 5/16-18 × 1¼" | 12 |
| 4 | END COVER (OPEN) | 1 |
| 5 | BEARING 22208 | 1 |
| 6 | DOWEL PIN ¼ × 5/8" | 4 |
| 7 | BEARING 22206 | 3 |
| 102 | INPUT SHAFT | 1 |
| 9 | EXT SNAP RING 1 9/16 | 1 |
| 150 | TOP SHIFTER FORK | 1 |
| 200 | TOP SLIDER GEAR | 1 |
| 170 | BOTTOM SHIFTER FORK | 1 |
| 300 | IDLER GEAR | 1 |
| 14 | BEARING 30209 | 1 |
| 400 | BOTTOM SLIDER GEAR | 1 |
| 104 | M60DSS/M60D/M72D OUTPUT SHAFT | 1 |
| 17 | BHCS 10-24 × ½" | 14 |
| 18 | RUBBER END CAP McMASTER 6448K82 | 2 |
| 19 | COOLER PLATE | 1 |

TABLE 1-continued

| No. | Description | QTY. |
|---|---|---|
| 20 | CENTER CASTING | 1 |
| 21 | BARB FITTING ½ BARB 3/8 NPT | 2 |
| 22 | ½" HOSE CLAMP | 2 |
| 23 | BELT TENSIONER | 1 |
| 24 | BLACK WATER HOSE ½" × 14" | 1 |
| 25 | SHCS 10-24 × ¾" | 10 |
| 26 | COOLER COVER | 1 |
| 27 | BARB FITTING ½ BARB ½ NPT | 2 |
| 28 | INTERMEDIATE PLATE | 1 |
| 29 | MAGNETIC PLUG ½ NPT | 1 |
| 30 | END COVER (BLIND) | 1 |
| 31 | NOTCHED BRACKET | 1 |
| 32 | SHIFTER HOUSING | 2 |
| 33 | SEAL SKF 4931 | 2 |
| 34 | SHIFT LEVER | 2 |
| 35 | ½" SHAFT COLLAR MCMASTER 6435K14 | 8 |
| 36 | SHCS 8-32 × 5/8 | 8 |
| 37 | SPRING (CS # B11-59) | 2 |
| 38 | PLUG ¼ NPT SQUARE HEAD | 1 |
| 39 | BEARING 6011 OPEN | 1 |
| 40 | O-RING # 154 McMASTER 9396K175 | 2 |
| 41 | CUP 362A | 1 |
| 42 | CONE 367 | 1 |
| 43 | SHCS 5/16-18 × ¾" | 4 |
| 44 | SHORT HOUSING | 1 |
| 45 | SHCS 5/16-18 × 2¼" | 8 |
| 46 | SPACER BUSHING | 1 |
| 47 | MOUNTING CLAMP | 2 |
| 48 | M60DSS/M60D/M72D LONG HOUSING | 1 |
| 49 | BEARING 22210 | 1 |
| 50 | ¼ SPCER | 1 |
| 51 | SEAL PACKAGE | 2 |
| 52 | O-RING # 327 McMASTER 9396K49 | 4 |
| 53 | SEAL SLEEVE PACKAGE | 2 |
| 54 | SEAL CUP | 2 |
| 55 | SEAL SLEEVE RETAINER | 2 |
| 56 | SET SCREW 5/16-24 × ½" | 6 |
| 57 | EXT SNAP RING HEAVY DUTY 1¾ | 2 |
| 58 | KEY 5/16 × 13/16 (M60DSS, M60D, M72) | 1 |
| 59 | GROOVED PLATE | 1 |
| 60 | SEAL SKF 25661 | 1 |
| 61 | SET SCREW 6-32 × ¼" | 4 |
| 62 | SPEEDI SLEEVE CR 99254 | 1 |
| 63 | SEAL SLEEVE BUSHING | 2 |
| 64 | SKID PLATE | 1 |
| 65 | ¼ FLAT WASHER | 4 |
| 66 | BOLT ¼-20 × ½" | 4 |
| 67 | STOP CLAMP | 2 |
| 68 | BOLT 5/16-18 × 2" | 2 |
| 69 | NYLON LOCK NUT 5/16-18 | 2 |
| 70 | SHCS 5/16-18 × ½" | 4 |
| 71 | 5" INNER BLADE COLLAR (M60DSS, M60D) | 2 |
| 72 | 5 × 5/8 OUTER B.C. (M60DSS, M60D) | 2 |
| 73 | 6" INNER BLADE COLLAR (M72D) | 2 |
| 74 | 6 × 5/8 OUTER B.C. (M72D) | 2 |
| 75 | DOWEL PIN 3/8 × 5/8 | 2 |
| 76 | DOWEL PIN 3/8 × 1¼ | 2 |
| 77 | STUD RHT | 1 |
| 78 | STUD LHT | 1 |
| 79 | O-RING # 020 | 2 |
| 80 | NUT 1-14 RHT | 1 |
| 81 | NUT 1-14 LHT | 1 |
| 82 | BUSHING RHT | 1 |
| 83 | BUSHING LHT | 1 |
| 84 | WASHER | 2 |
| 85 | BOLT 5/8-11 × 1½ RHT | 1 |
| 86 | BOLT 5/8-11 × 1½ LHT | 1 |
| 87 | TURNBUCKLE ½-13 LHT | 1 |
| 88 | COUPLING NUT 4" ½-13 R&L | 1 |
| 89 | NUT ½-13 | 1 |
| 90 | TURNBUCKLE ½-13 RHT | 1 |
| 91 | DRILL BUSHING 7/16OD × 0.251D × 1/2L | 2 |
| 92 | BARB FITTING ½ BARB ¼ NPT | 2 |

While the present invention has been described with regards to particular embodiments, it is recognized that additional variations of the present invention may be devised without departing from the inventive concept.

What is claimed is:

1. A method of generating multiple speeds on a concrete cutting saw, comprising the steps of:
   a. providing an idler gear;
   b. providing a top slider gear slidably engageable and disengageable with the idler gear; and
   c. providing a bottom slider gear slidably engageable and disengageable with the idler gear;
   d. sliding the top slider gear into one of a multiple top slider gear positions relative to the idler gear in combination with sliding the bottom slider gear into one of a multiple bottom slider gear positions relative to the idler gear to generate multiple transmission speeds;
   e. wherein the top slider gear comprises:
      i. a first toothed disk having a first size, and
      ii. a second toothed disk having a second size;
   f. wherein the idler gear comprises:
      i. a third toothed disk having a third size,
      ii. a fourth toothed disk adjacent to the third toothed disk, the fourth toothed disk having a fourth size,
      iii. a fifth toothed disk having a fifth size, and
      iv. a main gap in between the fourth toothed disk and the fifth toothed disk; and
   g. wherein the bottom slider gear comprises:
      i. a sixth toothed disk having a sixth size,
      ii. a seventh toothed disk adjacent to the sixth toothed disk, the seventh toothed disk having a seventh size, and
   h. wherein the first size and the fifth size are small sizes, the fourth size and sixth size are intermediate-sized sizes, and the second size, the third size, and the seventh size are large sizes.

2. The method of claim 1, further comprising:
   a. positioning the top slider gear in the main gap of the idler gear; and
   b. positioning the bottom slider gear in the main gap of the idler gear to generate a neutral gear position.

3. The method of claim 2, further comprising:
   a. positioning the first toothed disk of the top slider gear adjacent to and engaged with the third toothed disk of the idler gear while the second toothed disk of the top slider gear resides in the main gap, and
   b. positioning the sixth toothed disk of the bottom slider gear adjacent to and engaged with the fourth toothed disk of the idler gear while the seventh toothed disk of the bottom slider gear resides within the main gap to generate a first gear position.

4. The method of claim 3, further comprising:
   a. positioning the first toothed disk of the top slider gear adjacent to and engaged with the third toothed disk of the idler gear while the second toothed disk of the top slider gear resides in the main gap, and
   b. positioning the seventh toothed disk of the bottom slider gear adjacent to and engaged with the fifth toothed disk of the idler gear while the sixth toothed disk resides within the main gap to generate a second gear position.

5. The method of claim 4, wherein
   a. positioning the second toothed disk of the top slider gear adjacent to and engaged with the fifth toothed disk of the idler gear while the first toothed disk remains disengaged from the idler gear, and
   b. positioning the sixth toothed disk of the bottom slider gear adjacent to and engaged with the fourth toothed disk of the idler gear while the seventh toothed disk resides in the main gap to generate a third gear position.

6. The method of claim 5, further comprising:
   a. positioning the second toothed disk of the top slider gear adjacent to and engaged with the fifth toothed disk of the idler gear while the first toothed disk remains disengaged from the idler gear, and
   b. positioning the seventh toothed disk of the bottom slider gear adjacent to and engaged with the fifth toothed disk of the idler gear while the sixth toothed disk resides within the main gap to generate a fourth gear position.

* * * * *